United States Patent

Sumiyoshi et al.

[15] 3,690,197
[45] Sept. 12, 1972

[54] AUTOMATIC TRANSMISSION

[72] Inventors: Masaharu Sumiyoshi, Toyota; Shigeru Sakakibara, Chita-gun; Hisato Wakamatsu, Kariya; Takaaki Kato, Toyohashi, all of Japan

[73] Assignee: Nippondenso Kabushiki Kaisha, Aichi-ken, Japan

[22] Filed: June 12, 1970

[21] Appl. No.: 45,779

[30] Foreign Application Priority Data

July 18, 1969   Japan ...................... 44/57186

[52] U.S. Cl. .................................. 74/731, 74/752 A
[51] Int. Cl. ........................... F16h 47/04, F16h 5/42
[58] Field of Search .................... 74/731, 645, 752 A

[56] References Cited

UNITED STATES PATENTS

| | | | |
|---|---|---|---|
| 2,067,793 | 1/1937 | Seibold | 74/645 X |
| 2,503,434 | 4/1950 | Brunken et al. | 74/731 |
| 2,995,957 | 8/1961 | Wilson et al. | 74/752 A |

Primary Examiner—Carlton R. Croyle
Assistant Examiner—Thomas C. Perry
Attorney—Cushman, Darby & Cushman

[57] ABSTRACT

An automatic transmission for use in cars in combination with a torque-converter, gear transmission mechanism and frictional coupling means for establishing a required gear meshing relation of said gear transmission mechanism, said frictional coupling means being actuated by working oil supplied through a hydraulically actuating circuit including a regulating valve adapted to vary the pressure of said working oil, wherein said regulating valve is actuated to reduce the pressure of the working oil in response to a predetermined slip ratio of said torque-converter and/or a predetermined gear position of said transmission mechanism and/or a predetermined car-speed so that an impact due to variation of torque to be transmitted is eliminated.

3 Claims, 15 Drawing Figures

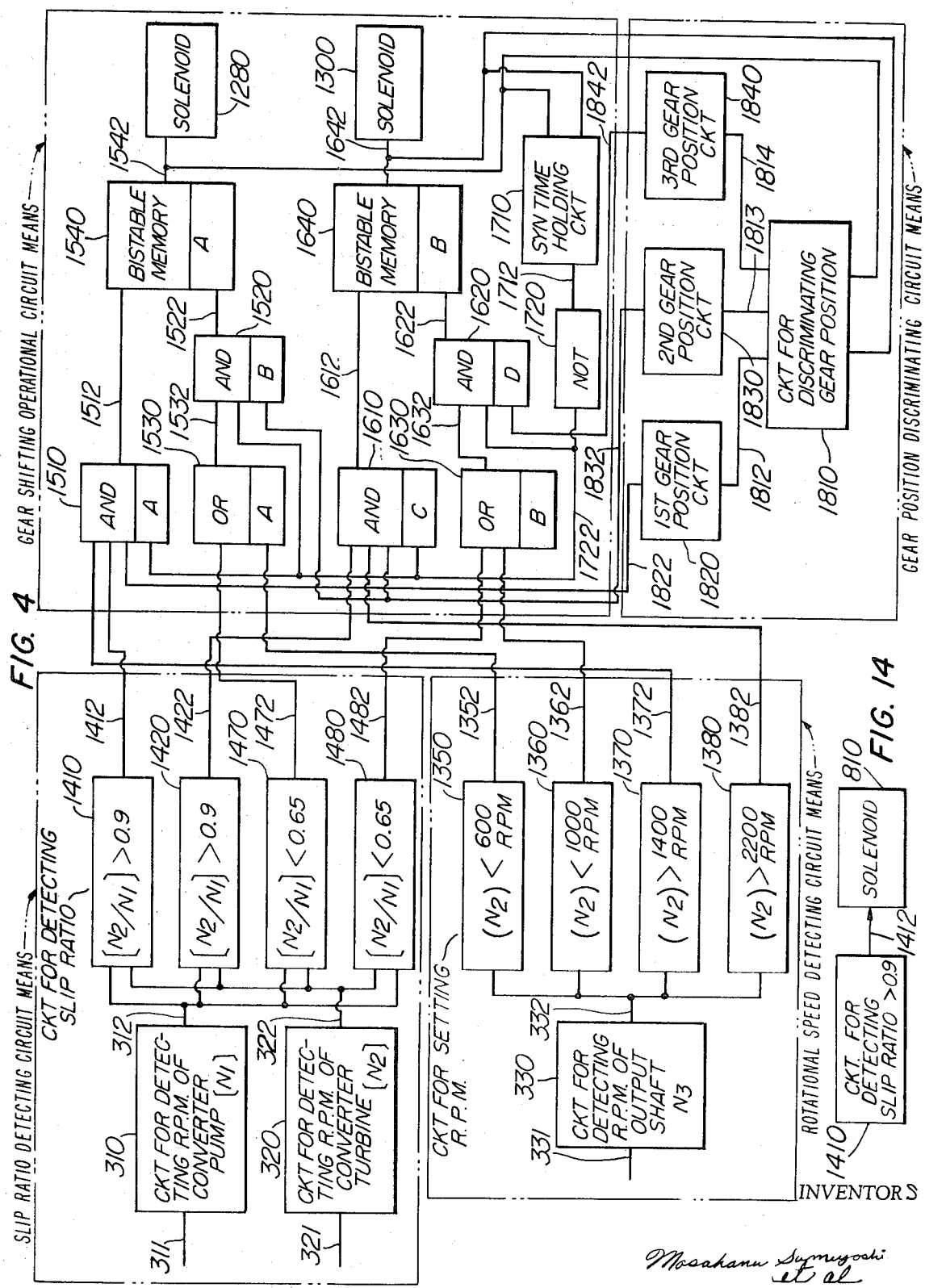

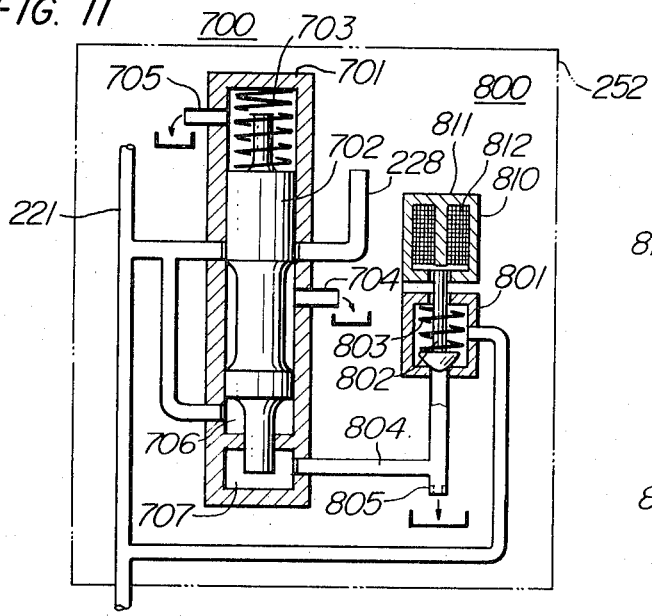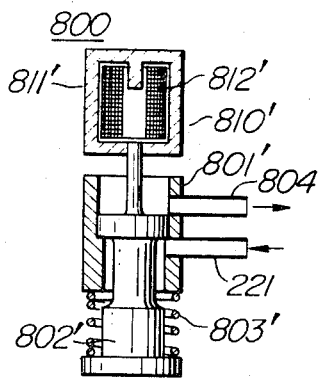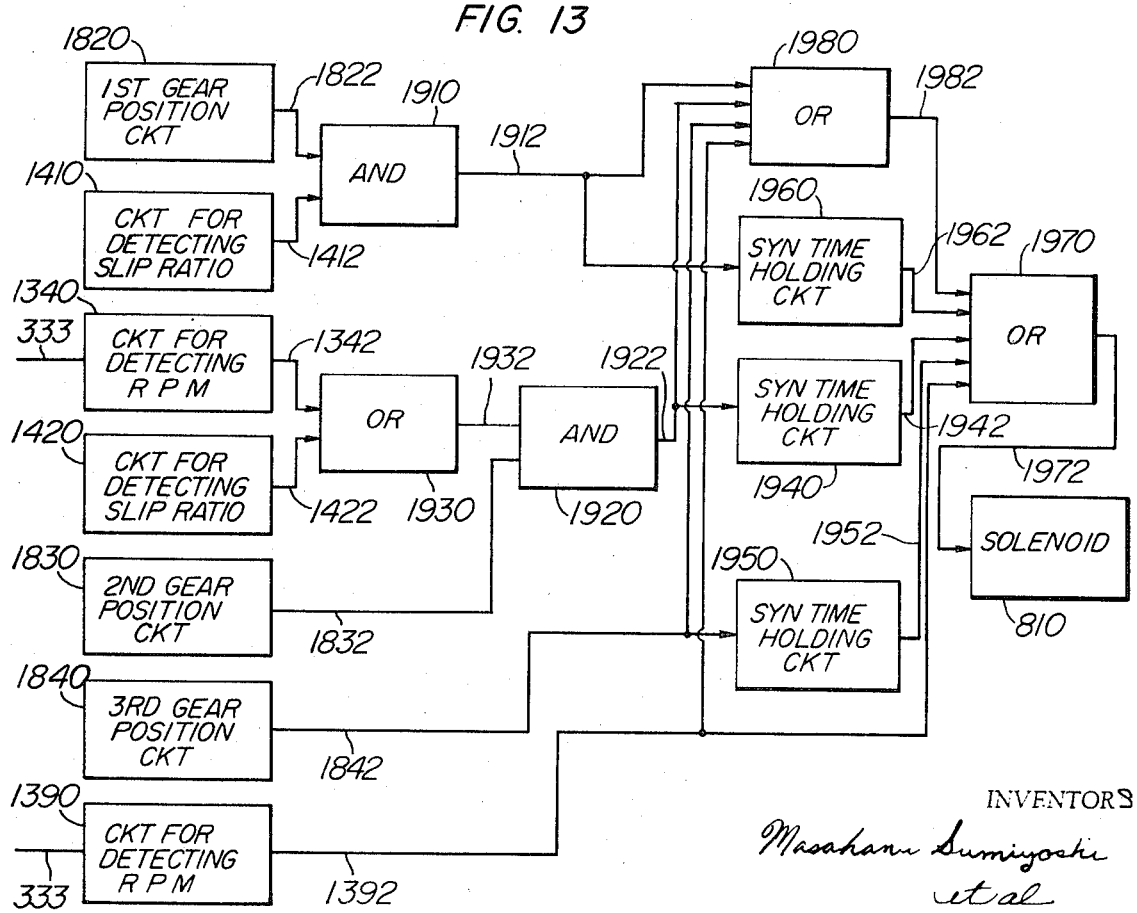

3,690,197

AUTOMATIC TRANSMISSION

BACKGROUND OF THE INVENTION:

This application is directed to an improvement over the related Sumiyoshi et al. application Ser. No. 876,784, filed Nov. 14, 1969, which is now abandoned in favor of the continuation-in-part application filed Feb. 4, 1972, Ser. No. 223,476, an assignee of which is the assignee hereof.

The present invention relates to generally an automatic transmission and more particularly an improvement of an electric type automatic transmission comprising an automatic transmission consisting of a torque-converter and a gear transmission mechanism, frictional coupling means, hydraulically actuating circuit means and electrical circuit means for controlling the hydraulically actuating circuit means.

When connecting operation of the frictional coupling means is effected upon gear change in the transmission of the type described above, greater impact is caused because of the difference between the torque transmitted from the engine and the freewheeling torque. To overcome this defect, the pressure of working oil actuating the frictional coupling means is generally reduced for a short time when the transmission is shifted from the first into the second gear. Further, the low pressure of working oil is maintained in the third gear ratio position. When these methods are not effective, the pressure of working oil is varied in response to the torque from the internal combustion engine. All of these methods require a complex hydraulic control circuit.

SUMMARY OF THE INVENTION:

To overcome these related problems, the present invention contemplates the use of an electrical control unit for controlling the pressure of the working oil in an automatic torque-converter transmission of the type employing an electrical circuit for controlling the shifting of the gear ratio. More particularly, the primary object of the present invention is to provide an automatic transmission in which a slip ratio (a ratio of a rotational speed of a converter turbine to that of a converter pump which ratio may most precisely represent the relation between a torque transmitted from the engine and a freewheeling torque of a vehicle) is detected so as to reduce the pressure of the working oil when a slip ratio is in excess of a predetermined value, thereby preventing the impact due to the difference between said two torques.

According to one aspect of the present invention, when a slip ratio of the torque-converter is in excess of a predetermined value, the regulating valve whose setting value may be varied is energized so that the pressure of the working oil applied to the frictional engagement or coupling means of the torque-converter is reduced, whereby the impact caused by the difference between the torque transmitted from the engine and the torque due to the freewheeling of the vehicle can be eliminated. Therefore, the shifting of speeds can be effected in a very smooth manner. In an automatic transmission of the type employing an electrical control unit for controlling the hydraulic circuit, the present invention may be applied by only the small modification of the regulating valve in the hydraulic circuit and the addition of a small-sized, light weight pressure increasing or intensifying valve so that the present invention is best suited for an automobile which must be made light in weight. Instead of the regulating valve, any other suitable means is employed for regulating the pressure of the working oil to be discharged in response to a signal.

According to one aspect of the present invention, the signals from a circuit for detecting a gear position and from a circuit for detecting a slip ratio are applied to the regulating valve through an AND circuit so that when a slip ratio of the torque-converter is in excess of a predetermined value at a predetermined gear position, the setting of the regulating valve is varied so as to reduce the pressure of the working oil applied to the frictional engagement or coupling means of the torque-converter. Therefore, the impact caused when shifting of speeds is effected may be advantageously eliminated.

According to another aspect of the present invention, the output signal of an AND circuit to which are applied the signals from a circuit for detecting the gear position and a circuit for detecting the slip ratio and the output signal from a circuit for detecting the rotational speed and generating an output signal when car-speed becomes faster than a predetermined value are applied to the regulating valve so that when a slip ratio becomes higher than a predetermined value at a predetermined gear position and when the car-speed becomes higher than a predetermined value, the pressure of the working oil applied to the frictional engagement or coupling means is reduced whereby the impact caused when the shifting of speeds is effected and the durability of a gear pump for generating the pressure of the working oil may be advantageously improved.

The above and other objects, features and advantages of the present invention will become more apparent from the following description of one preferred embodiment thereof taken conjunction with the accompanying drawings.

BRIEF DESCRIPTION OF THE DRAWING:

FIG. 4 is a block diagram of an electrical control unit thereof;

FIG. 11 is a detailed diagram illustrating a regulating valve in the hydraulic circuit;

FIG. 12 is a diagram illustrating another embodiment of a pressure intensifying valve in the regulating valve;

FIG. 13 is a block diagram illustrating a circuit for controlling the pressure of working oil; and FIG. 14 is a block diagram showing another embodiment of a basic circuit for reducing working oil pressure.

DESCRIPTION OF THE PREFERRED EMBODIMENT:

A three-forward-speed (automatic) transmission embodying the present invention will be described hereinafter, but it will be understood that the present invention may be applied to two-forward-speed, four-forward-speed and multi-forward-speed transmissions.

Figure 1:
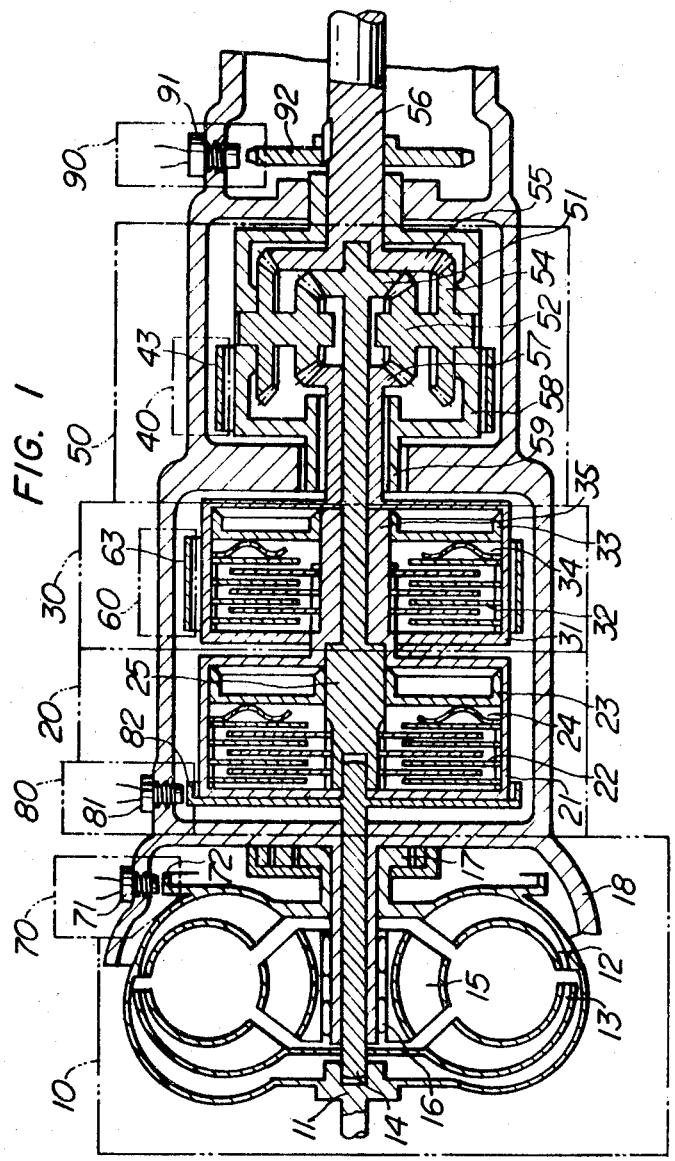
FIG. 1 is a sectional view of a three-forward-speed automatic transmission embodying the present invention.

The three-speed automatic transmission shown in FIG. 1 comprises a torque-converter 10 and a gear transmission comprising a front clutch 20, a rear clutch 30, a rear brake 40, a gear train 50 and a front brake 60. The shaft 11 of a converter pump is directly connected to an internal combustion engine (not shown) and to the converter pump 12. The torque-converter 10 comprises the torque-converter pump 12, a torque-converter turbine 13 in opposed relation with the pump 12 and a stator 15 having a one-way clutch 16 interposed between the pump 12 and the turbine 13. The detailed description of the mode of operation of the torque-converter 10 will not be made because it is well known in the art. In short the converter pump 12 causes the circulation of the oil so that the momentum of the circulating oil is transmitted to the converter turbine 13 which in turn transmits the rotation to the turbine shaft 14.

There exists a difference in rotational speed (slip ratio) between the torque converter pump 12 and the torque converter turbine 13 when the rotation is transmitted from the former to the latter. When the difference is small, the torque transmitted is small while when the difference is greater, the torque transmitted is greater. That is, they are capable of transmitting a varying rotational force. The difference in rotational speed may be expressed in terms of a rotational ratio or slip ratio.

A hydraulic pump 17 of the gear pump type is coupled to the pump shaft 11 directly for the purpose to be described in detail hereinafter. The front clutch 20 comprises a clutch drum 21 made integral with the turbine shaft 14, a multi-disk clutch 22, a clutch piston 23, a plate spring 24 and a clutch shaft 25. When the clutch piston 23 is actuated by the working oil under pressure, the turbine shaft 14 is coupled to the clutch shaft 25 through the clutch 20.

The rear clutch 30 comprises a clutch shaft 35 made integral with the clutch drum 21, a clutch drum 31, a multi-disk clutch 32, a clutch piston 33 and a plate spring 34. When the working oil acts upon the clutch piston 33, the drum 21 is coupled to the clutch drum 31 through the rear clutch 30.

Figure 2:
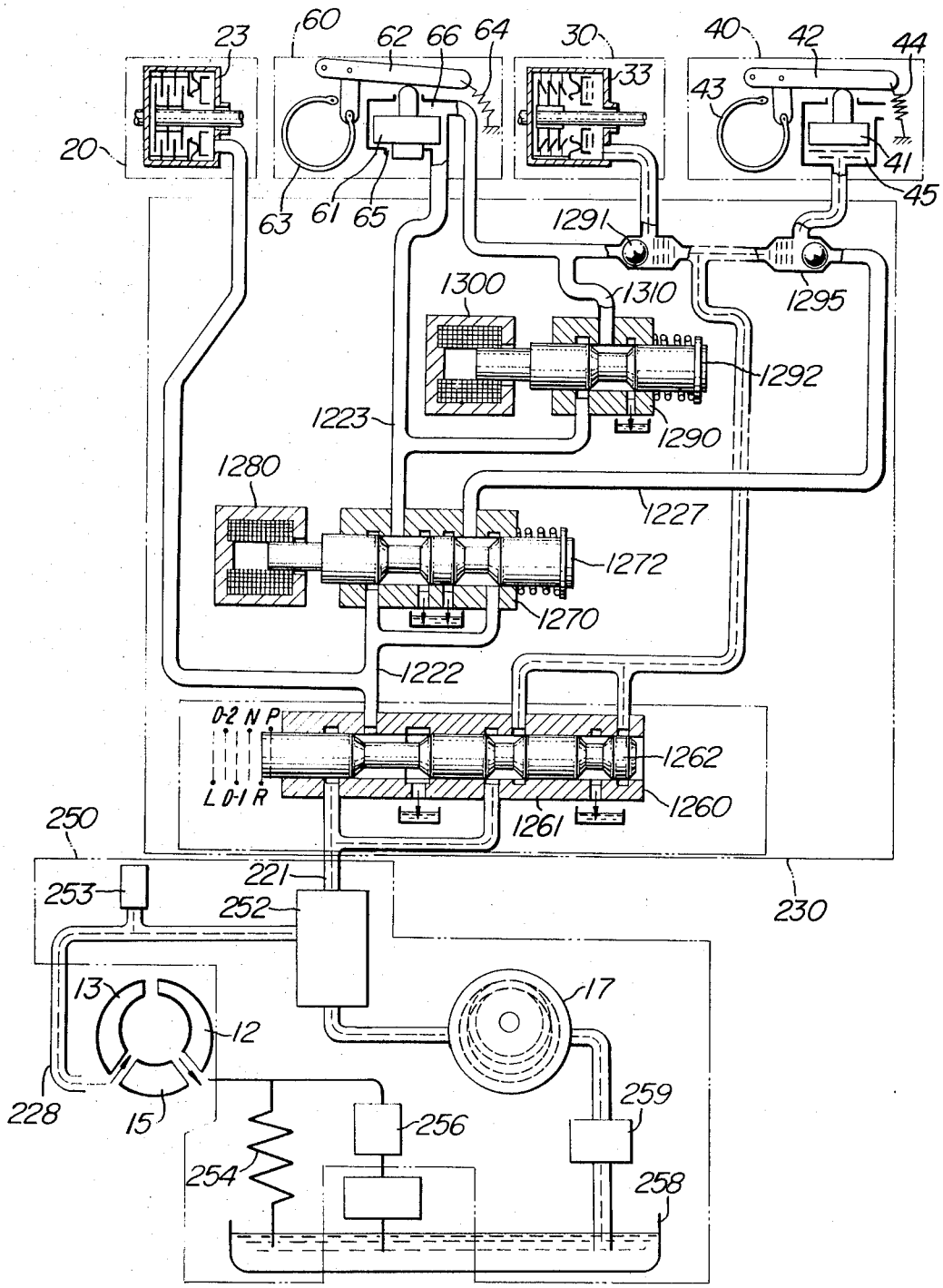
FIG. 2 is a hydraulic circuit thereof.

The rear brake 40 comprises, as shown in FIG. 2, a brake piston 41, a brake link 42, a brake band 43, a return spring 44 and a brake cylinder 45. When the working oil acts upon the brake piston 41, the brake band 43 so actuates as to tighten itself, thereby stopping the rotation of a carrier 58 of the gear train 50 relative to a housing 18.

As shown in FIG. 2, the front brake 60 comprises a brake piston 61, a brake link 62, a brake band 63, a return spring 64, and brake cylinders 65 and 66. When the brake cylinder 65 is filled with the working oil, the brake band 63 is tightened so as to stop the rotation of the clutch drum 31 relative to the housing 18. When the working oil is supplied to the brake cylinder 66, the brake piston 61 is displaced downwardly in FIG. 2, thereby permitting the rotation of the clutch drum 31 relative to the housing 18. These clutches and brakes are substantially similar to the conventional ones.

The gear train 50 comprises for example, a first sun gear 51, a second sun gear 57, a third sun gear 55, a first planetary gear 52, a second planetary gear 54, an output shaft 56 and a carrier 58. The first and second sun gears 51 and 57 are in mesh with each other through the first planetary gear 52. The second planetary gear 54 is made integral with the first planetary gear 52 and in mesh with the third sun gear 55.

Depending upon the engagement and disengagement of the front clutch 20, the rear clutch 30, the front and rear brakes 60 and 40, the gear meshing relation of the planetary gear set changes as follows:

TABLE I

| | | Front clutch 20 | Rear clutch 30 | Front brake 60 | Rear brake 40 |
|---|---|---|---|---|---|
| Reverse | R | disengage | engage | disengage | engage |
| F | First | engage | disengage | disengage | engage |
| O | L | | | | |
| W | Second | engage | disengage | engage | disengage |
| A | DL | | | | |
| R | Third | engage | engage | disengage | disengage |
| D | DH | | | | |

Figure 5:
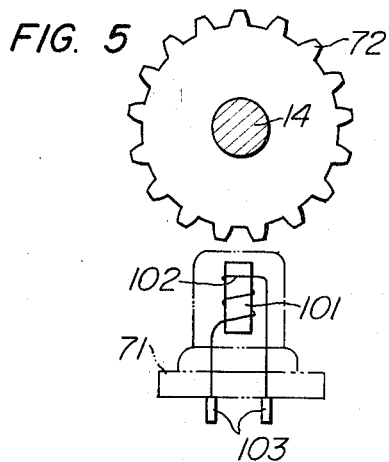
FIG. 5 is a schematic view illustrating a tachometer thereof.

Reference numerals 70, 80 and 90 designate rotational speed detectors for the torque-converter pump shaft, the torque-converter turbine shaft and the output shaft. As shown in FIG. 5, the rotational speed detector 70 for the torque-converter turbine shaft comprises a pickup 71 fixed to the housing 18 and a toothed wheel 72 carried by the torque-converter shaft 14. The pickup 71 includes a permanent magnet 101 and a coil 102 wound therearound so that when the teeth of the toothed wheel 72 passes through the magnetic field of the permanent magnet 101, the flux passing through the coil 102 changes, thereby inducing the pulsating voltage across the coil 102.

FIG. 2 shows a hydraulic circuit of the three-speed automatic transmission of the present invention. The circuit is comprised mainly of a hydraulic pressure source 250 and an actuating circuit 230, which comprises a valve 1260 for setting the shifting zone, distribution valves 1270 and 1290, solenoids 1280 and 1300, check valves 1291 and 1295 and oil passages. The hydraulic pressure source 250 comprises a hydraulic pump 17, an oil filter 259, an oil pan or reservoir 258, a pressure control valve 256, a regulating valve 252, a relief valve 253, an oil cooler 254, etc. and serves to supply the working oil for the actuating circuit 230 and the torque-converter working oil and the lubricant for gears. The regulating valve 252 comprises a constant pressure valve 700 and a pressure increasing or intensifying valve 800 so as to vary the pressure of the working oil to be discharged as will be described in more detail hereinafter with reference to FIG. 11. The valve 1260 for setting the shifting zone comprises a valve spool 1262 and a valve housing 1261, and the valve spool 1262 is coupled to a control lever (not shown) which is arranged close to the driver's seat so that when the control or selector lever is positioned in P, R, N, D-1, D-2 or L (P = parking, R = reverse, N = neutral, D-1 = drive-1, D-2 = drive-2 and L = low gear), the valve spool 1262 is positioned at a corresponding predetermined position P, R, N, D-1, D-2 and L shown in FIG. 2.

The passage 221 to the valve 1260 is branched into two passages and the passage 1222 from the valve 1260 is also branched into two passages, one passage being communicated with the first distribution valve 1270 while the other, to the front clutch 20. The oil passage 1223 from the first distribution valve 1270 is branched into two passages, one being communicated directly to the brake cylinder 65 of the front brake 60 while the other, the second distribution valve 1290. The oil passage 1310 from the second distribution valve 1290 is communicated to the rear clutch 30 and the cylinder 66 of the front brake 60. The solenoids 1280 and 1300 are mounted upon the valve spools 1272 and 1292 of the first and second distribution valves 1270 and 1290 respectively. The following gear meshing relation is established by the energization of the solenoids 1280 and 1300 when the valve spool 1262 is placed at the position D-2 (drive-2):

TABLE II

| | Solenoid 1280 | Solenoid 1300 |
|---|---|---|
| First | de-energized | de-energized |
| Second | energized | de-energized |
| Third | energized | energized |

When the solenoid 1280 is energized, the first distribution valve 1270 has its valve spool 1272 displaced to the left so that the oil passages 1222 and 1223 are intercommunicated with each other. Upon de-energization of the solenoid 1280, the valve spool 1272 is displaced to the right as shown in FIG. 2, thereby interrupting the intercommunication between the oil passages 1222 and 1223 and establishing the intercommunication between the oil passages 1222 and 1227.

When the second distribution valve 1290 is in the position shown in FIG. 2, the intercommunication between the passages 1223 and 1310 is interrupted, but when the solenoid 1300 is energized, the valve spool 1292 is displaced to the left, thereby establishing the intercommunication between the oil passages 1223 and 1310.

The shifting of the gear ratio of the three-forward-speed automatic transmission in accordance with the present invention is determined as follows. That is, the shifting line of the transmission is determined by the operating condition of the internal combustion engine detected from the r.p.m. of the converter pump shaft $N_1$, the operating condition of the torque-converter detected from the slip ratio and the driving condition detected from the r.p.m. of the output shaft $N_3$ (or r.p.m. of the torque-converter turbine shaft $N_2$). It is of course possible to determine the shifting line from the relation between the car-speed and the negative pressure for suction of the air of the engine or a degree of opening of a throttle valve.

Limit of r.p.m. of the Internal Combustion Engine:

The smooth rotation of the internal combustion engine is not expected at an r.p.m. less than a predetermined value so that it is not preferable to shift from the first into the second gear or from the second into the third gear when the engine rotates at an excessively lower r.p.m. That is, shifting must be made at an r.p.m. faster than the minimum r.p.m. inherent to each engine. This means that the car-speed shifting zone is limited by a predetermined r.p.m. (The lower limit in the car-speed shifting zone exists because of the performance of the internal combustion engine.) On the other hand, when the shift is made from the top into the second or from the second into the low, it is preferable to continue running until the r.p.m. of the engine is reduced to a certain minimum value at which the automobile can travel at its third or second gear. That is, the shifting zone is limited below a lower r.p.m. (This means that the shifting zone has a certain upper limit.) However, since the torque transmitted at a low car-speed is exceedingly small, the r.p.m. of the engine is not required to be taken into consideration. Therefore, in the shifting lines shown in FIGS. 3A and 3B, the car-speed limit to be described hereinafter is taken into consideration, but there is no limit in the rotational speed of the engine.

Figure 3A:
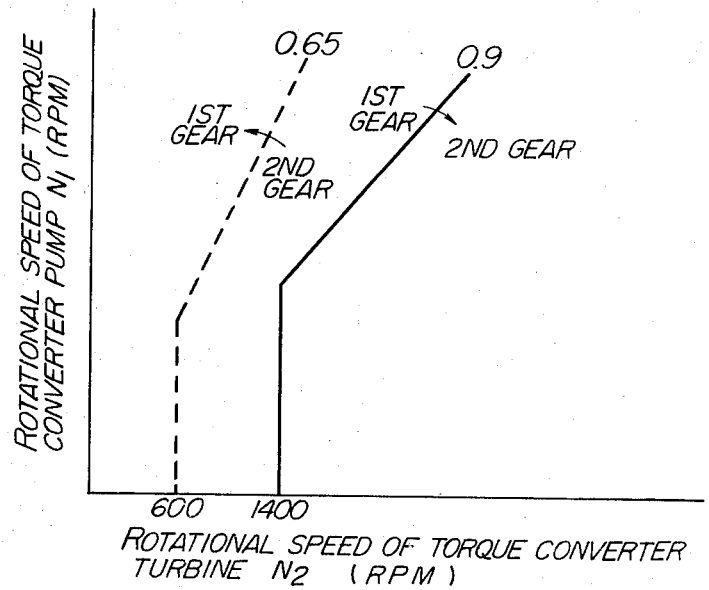
FIGS. 3A and 3B are graphs illustrating the rotational speed relation between the torque-converter turbine shaft and the torque-converter pump shaft for explanation of the shifting the gear ratio of the automatic transmission.
Figure 3B:
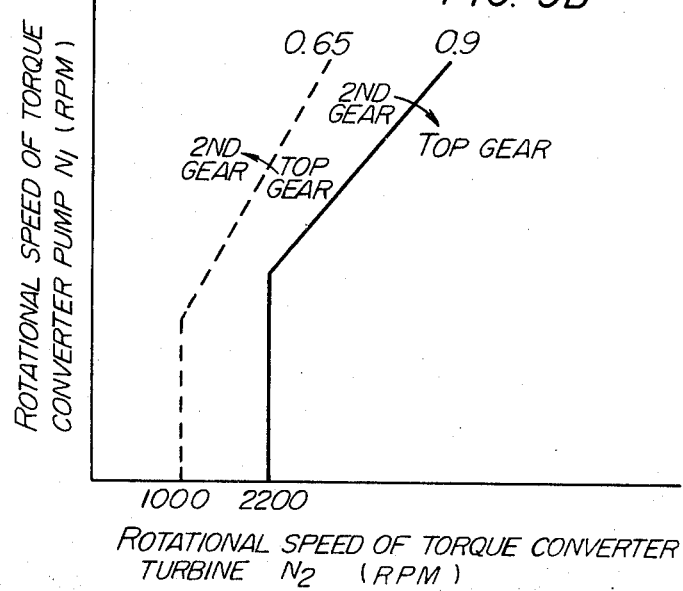

Car-Speed Limit:

In a ground vehicle and especially in an automobile, it is not preferable to shift from the second into the third gear or from the first into the second gear when the car-speed is excessively lower because the acceleration is not accomplished as desired. Therefore, the shifting zone must be limited at a car-speed higher than a predetermined value. In FIGS. 3A and 3B, the car-speed is about 15 km/hr. ($N2 = 1,400$ r.p.m.) when the shift is made from the first into the second gear ratio; about 40 km/hr. ($N2 = 2,200$ r.p.m.) when shifted from the second into the third or top gear ratio. (In this case, the shifting zone has a lower limit which is determined by the performance of the vehicle). It is also not preferable to shift from the top into the second gear or from the second into the first when the car-speed is high because the noises and vibrations are caused. Therefore, it is preferable to continue running at the third or second gear until the car-speed is reduced to a minimum speed at which the vehicle can continues running at the second or third gear. This means that the shifting zone is limited below a car-speed less than a predetermined speed not so faster. (In this case, the shifting zone has an upper limit which is determined by the performance of the vehicle). In FIGS. 3A and 3B, the car-speed is 10 km/hr. ($N2 = 600$ r.p.m.) when the shift is made from the second into the first gear, and about 25 km/hr. ($N2 = 1,000$ r.p.m.) when shifted from the top into the second gear.

Limit of the Slip Ratio:

The torque transmission performance is much affected when a slip ratio ( = N2/N1) is a value less than but very close to unity or a value higher than unity. In the former case, the torque is transmitted from the internal combustion engine to the output shaft 56 while in the latter case, the torque is transmitted from the output shaft 56 to the internal combustion engine so as to "drive" the latter.

Transmission of Torque from Engine to Output Shaft 56:

This is the case in which the vehicle is running upon horizontal roads and up hills. It is preferable to shift from the first into the second gear or from the second into the third gear when the slip ratio is almost unity in order to make full use of the torque converter. The range of the slip ratio is about 0.5 – 1.00. In FIGS. 3A and 3B, this slip ratio is 0.9.

On the other hand, it is preferable that the slip ratio becomes lower than the above mentioned slip ratio when the shift is made from the third into the second gear or from the second into the first gear in order to make full use of the torque converter. That is, the shifting zone must be limited below a slip ratio less than a predetermined value which is determined by the performance of the torque converter. (In this case, the shifting zone has an upper limit of the slip ratio determined by the performance of the torque converter which is about 0.9. In FIGS. 3A and 3B, this slip ratio is 0.65).

Transmission of Torque from Output Shaft 56 to Engine:

This occurs (1) when the so-called engine brake is applied so as to decelerate the car and (2) when the car speed is increased as the vehicle runs along the gentle down hill. In both cases, the slip ratio becomes higher than 0.9. According to the present invention, the pressure of the working oil is reduced when the slip ratio is higher than a predetermined value (0.9). And, the pressure is not further reduced under the above conditions (1) and (2) under which the slip ratio is always above 0.9, and the shifting lines of these conditions are not shown in FIGS. 3A and 3B.

Electrical Control Unit:

FIG. 4 shows the block diagram of the electrical control unit for determining the shifting lines, comprising operational circuits 310, 320 and 330 for detecting the rotational speeds of the torque converter pump shaft, the torque converter turbine shaft and the output shaft; four slip ratio detecting circuits 1410, 1420, 1470 and 1480; four operational circuits 1350, 1360, 1370 and 1380 for setting the rotational speeds; four AND circuits 1510, 1520, 1610 and 1620, two OR gates 1530 and 1630; two bistable memories 1540 and 1640, a synchronous time holding circuit 1710, a NOT circuit 1720, three gear position circuits 1820, 1830 and 1840 and a logical circuit 1810 for discriminating the gear position.

Figure 6:
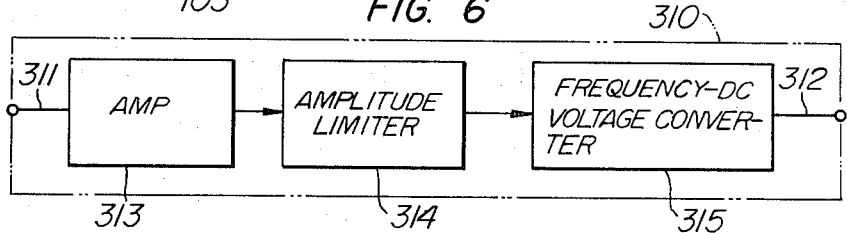
FIG. 6 is a block diagram of an operational circuit for detecting the rotational speed thereof.

Next the mode of operation of the electrical control unit will be described. When the control or selector lever is selected into the position D-2 (drive-2), the control unit is electrically coupled to a power source (not shown). The input signals are applied to the operational circuit 310 for detecting the rotational speed of the torque converter pump shaft as the output voltages S1 from the pickup 70 (see FIG. 1) through the lead wire 311. The operational circuit 310 comprises an amplifier 313, an amplitude limiter 314 and a frequency-DC voltage converter 315 as shown in FIG. 6 and the output signals are derived from the wire 312. The operational circuits 320 and 330 for the torque converter turbine shaft and the output shaft have the similar constructions as that of the operational circuit 310 and the input signals to the circuits 320 and 330 are applied from the wires 321 and 331 while the outputs are derived from the wires 322 and 332.

Figure 7:
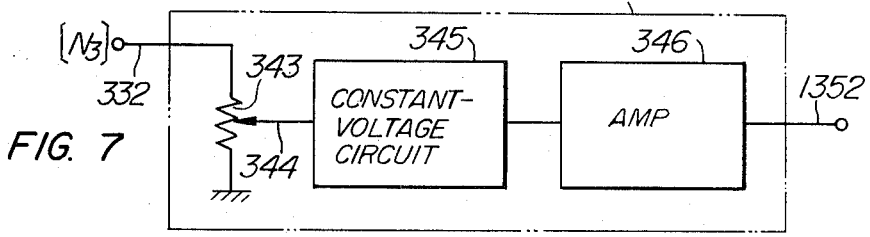
FIG. 7 is a block diagram of an operational circuit for setting the rotational speed.

The output signals [N3] from the circuit 330 and representative of the rotational speeds of the output shaft are applied to the operational circuits for setting the rotational speeds 1350 ((N2) is less than 600 r.p.m.), 1360 ((N2) is less than 1,000 r.p.m.), 1370 ((N2)is greater than 1400 r.p.m.) and 1380 ((N2) is greater than 2,200 r.p.m.). The output signals representative of (N2) < 600 r.p.m., (N2) < 1,000 r.p.m., (N2) > 1,400 r.p.m. and (N2) > 2,200 r.p.m. are derived from the wires 1352, 1362, 1372 and 1382 respectively. The operational circuit 1350 for setting the rotational speed comprises a potentiometer 343 having a sliding arm 344, a constant voltage circuit 345 having a reference diode and an amplifier 346 as shown in FIG. 7. The circuits 1360, 1370 and 1380 have the similar constructions as that of the circuit 1350. (N2) used above designates the rotational speeds of the torque converter turbine shaft converted from [N3].

Figure 8:
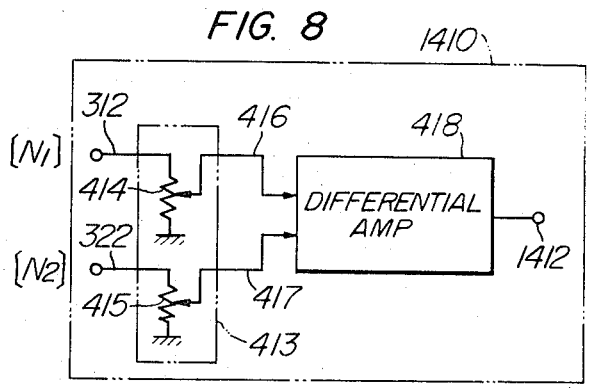
FIG. 8 is a block diagram of an operational circuit for detecting a slip ratio of the torque-converter.

Two kinds of input signals [N1] and [N2] are applied through the wires 312 and 322 to the slip ratio detecting circuits 1410, 1420, 1470 and 1480. The output signals representative of [N2/N1] > 0.9; [N2/N1] > 0.9; [N2/N1] < 0.65 and [N2/N1] < 0.65 are derived from the wires 1412, 1422, 1472 and 1482 as voltage signals. The slip ratio detecting circuit 1410 comprises a potentiometer 414 having a sliding arm 416, another potentiometer 415 having a sliding arm 417 and a differential amplifier 418 as shown in FIG. 8. A voltage representative of 0.9 × N1 is derived at the terminal 416 of the potentiometer 414 while the voltage representative of N2 is derived at the terminal 417 of the potentiometer 415. When the N2 is greater than 0.9 × N1, the output signal is derived from the differential amplifier 418 into the wire 1412. The circuits 1420, 1470 and 1480 are similar in construction to the circuit 1410.

The inputs to the AND circuit 1510-A are applied through the wires 1412, 1372, 1722 and 1822 from the slip ratio detecting circuit 1410 ([N2/N1] > 0.9), the circuit 1370, the NOT circuit 1720 and the low gear position circuit 1820. When all of the inputs are applied at the same time, the AND circuit 1510-A generates an output signal in the wire 1512. The input signals to the AND circuit 1610-C are applied from the slip ratio detecting circuit 1420 ([N2/N1] > 0.9), the circuit 1380 ((N2) > 2,200 r.p.m.), the second gear position circuit 1830 and the NOT circuit 1720. When all of these input signals are applied simultaneously, the output signal is derived in the wire 1612.

When the input signals are applied simultaneously through the wires 1532, 1722 and 1832 to the AND circuit 1520–B, the output signal is derived therefrom through the wire 1522. When the signals are simultaneously applied to the AND circuit 1620–D through the wires 1632, 1722 and 1842, the output signal is derived at the wire 1622.

When either of the output signal from the slip ratio detecting circuit 1470 ([N2/N1] < 0.65) or the output signal from the circuit 1350 ((N2) < 600 r.p.m.) is applied to the OR circuit 1530–A, the output signal is derived in the wire 1532. When either of the output signal from the circuit 1360 ((N2) < 1,000 r.p.m.) or the output signal from the slip ratio detecting circuit 1480 ([N2/N1] < 0.65) is applied to the OR gate 1630–B, the output signal is derived in the wire 1632.

Figure 10:
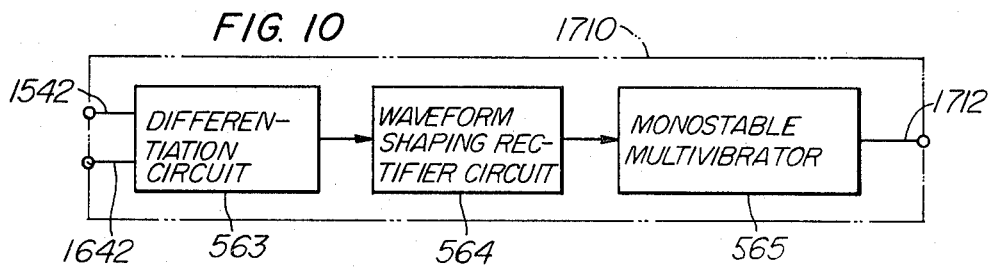
FIG. 10 is a block diagram of a synchronous time holding circuit.
Figure 9:
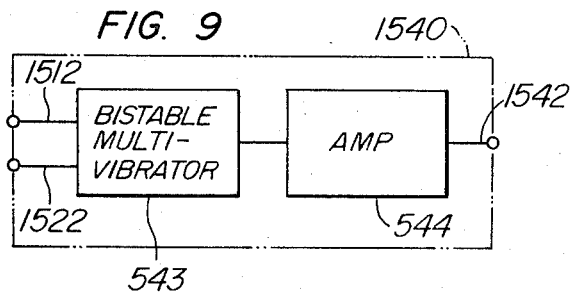
FIG. 9 is a block diagram of a bistable type memory.

As shown in FIG. 9, the bistable memory 1540–A comprises a bistable multivibrator 543 and an amplifier 544. When a signal is applied to the wire 1512, the multivibrator 543 is switched into one state in which the memory 1540–A keeps generating the signals in the wire 1542. On the other hand, when the signal is applied to the wire 1522, the multivibrator 543 is switched into the other state in which no output signal is derived therefrom. The memory 1640–B has the similar constructions as that of the memory 1540–A. As shown in FIG. 10, the synchronous time holding circuit 1710 comprises a differentiation circuit 563 which has two input terminals 1542 and 1642 and is adapted to produce a differentiated waveform when an input signal is applied to one of the terminals 1542 or 1642, a waveform shaping rectifier circuit 564 and a monostable multivibrator 565 adapted to generate pulses each having a predetermined pulse width.

The NOT gate 1720 in FIG. 4 will not generate the output when an input signal is applied thereto, but generates the output when the input is not applied thereto.

The logical circuit for discriminating the gear position 1810 is adapted to discriminate whether the transmission is in the first, second or third gear ratio position depending upon whether a signal is applied or not applied to the wires 1542 and/or 1642. The output signals are derived in the wires 1812, 1813 and 1814 respectively. The circuit 1810 is comprised of NOT gates and AND gates. The gear position circuits 1820, 1830 and 1840 may be amplifiers or terminals.

Next the mode of operation of the electrical control unit (FIG. 4) will be described. The object of the electrical control unit is to automatically shift the speed change gear by energizing and de-energizing the solenoids 1280 and/or 1300 as described hereinabove. (See Table II). When the slip ratio [N2/N1] > 0.9 and (N2) > 1,400 r.p.m. in FIG. 3A, that is when upon traveling at the first gear the traveling condition is such that it moves to the right across the solid shifting line, the signals from the slip ratio detecting circuit 1410, the circuit 1370, the NOT gate 1720 and the low gear position circuit 1820 are applied to the AND gate 1510–A and then the output signal is derived into the wire 1512 so that the bistable memory 1540–A generates the output signals, thereby energizing the solenoid 1280. That is, the transmission is shifted from the first into the second gear. When the traveling condition is such that it moves to the left across the dotted shifting line in FIG. 3A, the OR gate 1530–A and, AND gate 1520–B generates the output signals so that memory 1540–A extinguishes the output signal thereby, de-energizing the solenoid 1280 whereby the transmission is shifted from the second into the first gear.

When the traveling condition is such that it moves to the right across the solid shifting line in FIG. 3B, the AND gate 1610–C and the bistable memory 1640–B generate the output signals so that the solenoid 1300 is energized, whereby the transmission is shifted from the second into the third gear. When the traveling condition is such that it moves to the left across the dotted shifting line in FIG. 3B, the OR circuit 1630–B and AND gate 1620–D generate the output signals so that the memory 1640–B extinguishes the output signal, thereby de-energizing the solenoid 1300, whereby the transmission is shifted from the top into the second gear. The structural components of the above described electrical circuit is not limited to those of the instant embodiment, but other circuits employing relays may be used.

Upon the shifting of the gears, when the difference between the torque produced by the engine and the torque caused by the freewheeling of the vehicle is greater, that is when the slip ratio is greater than a predetermined value, a great impact is generated. In order to prevent this impact, the present invention contemplates to reduce the pressure of the working oil applied to the friction engagement means when the slip ratio is higher than a predetermined value. For this purpose, the regulating valve 252 shown in FIG. 2 has a construction as shown in FIG. 11 and is controlled by an electric circuit for controlling the pressure of the working oil shown in FIG. 13.

As shown in FIG. 11, the regulating valve 252 comprises the constant pressure valve 700 and the pressure increasing valve 800. The constant pressure valve 700 comprises a valve housing 701, a valve spool 702 and a spring 703 so that the working oil under pressure admitted into the oil passage 221 is discharged through the oil passages 704 and 228, thereby controlling the pressure. That is, the working oil admitted into a space 706 pushes the valve spool 702 upwardly, thereby increasing the quantity of working oil to be discharged. On the other hand, when the valve spool 702 is pushed downwardly, the quantity of the working oil to be discharged is reduced. When the discharge of the working oil is increased, the pressure in the oil passage 221 is reduced and vice versa. When the upward force pushing the valve spool produced by the oil in the space 706 is balanced with the downward force of the spring 703 acting upon the valve spool so as to push it downwardly, the valve spool 702 is held in stationary position so that the pressure in the oil passage 221 is maintained at a predetermined constant value.

The pressure increasing valve 800 comprises a valve comprising a valve housing 801, a valve rod 802 and a spring 803 and a solenoid comprising a magnetic path 811 and a winding 812. The valve rod 802 is normally pushed downwardly by the spring 803 so that the working oil is normally not permitted to enter the valve 800 from the oil passage 221. When the solenoid is energized, the valve rod 802 is pushed upwardly, so that the working oil passes through the oil passage 804 from the passage 221 into the space 707 of the valve 700, thereby pushing the valve spool 702 upwardly. The oil is also discharged through the restricted portion 805, but the diameter of the restricted portion 805 is so determined that the sufficient pressure is generated in the space 707 even when the oil is discharged through the restricted portion 805. Since the valve rod 802 is pushed downwardly by the spring 803 when the solenoid is de-energized, no working oil is supplied to the space 707 and the oil is discharged through the restricted portion 805, the pressure in the space 707 is rapidly reduced. When the working oil is introduced into the space 707, the valve rod 702 is pushed upwardly as described hereinabove and, the quantity of the working oil discharged through the oil passage 704 is increased so that the pressure in the oil passage 221 is reduced.

Thus the pressure in the oil passage 221 is reduced when the solenoid 810 of the pressure increasing valve 800 is energized (the pressure is reduced and maintained at a constant value), and is returned to the normal pressure when the solenoid is de-energized.

According to another embodiment of the present invention as shown in FIG. 12, the pressure increasing valve 800 may be comprised of a valve comprising a valve housing 801', a valve spool 802' and a spring 803' and a solenoid 810' comprising a magnetic path 811' and a solenoid winding 812'. When the solenoid 810' is energized, the valve spool 802' is lifted by the solenoid 810' so that the oil in the oil passage 221 is admitted into the space 707 through the oil passage 804. Upon de-energization of the solenoid 810', the valve spool 802' is pushed downwardly by the spring 803' so that no working oil is admitted into the oil passage 804 while the working oil filled in the passage 804 is discharged.

FIG. 13 is a block diagram of an electrical control unit for energizing the solenoid 810, thereby reducing the working oil pressure. The slip ratio detecting circuits 1410, 1420, the first gear position circuit 1820, the second gear position circuit 1830 and the third gear position circuit 1840 shown in FIG. 4 are employed in this unit. In addition to these circuits, the control unit includes rotational speed detecting circuits 1390 ([N3] > 3,000 r.p.m. which corresponds to a car-speed of 50 km/hr.) and 1340 ([N3] < 1,800 r.p.m. which corresponds to 30 km/hr.), AND gates 1910 and 1920, OR gates 1930, 1970 and 1980 and synchronous time holding circuits 1940, 1950 and 1960. These circuits have the same constructions and functions as those described hereinabove, so that no further description will be made.

According to the present invention, when the slip ratio is higher than a predetermined value, the pressure of the working oil is reduced. More particularly, the pressure of the working oil is reduced in response to the conditions to be described below:

1. when, or (1') for predetermined time interval immediately after, the transmission is in the first gear ratio position and the slip ratio is in excess of 0.9;

2. when, or (2') for predetermined time interval immediately after, slip ratio is in excess of 0.9 or when the car-speed is less than 30 km/hr. ([N3] = 1,800 r.p.m.) and the transmission is in the second gear ratio position;

3. when, or (3') for predetermined time interval immediately after, the transmission is in the third gear ratio position;

4. when the car-speed is higher than 50 km/hr. ([N3] = 3,000 r.p.m.).

When the car is running at the speed less than 30 km/hr. at the second gear, when it is running at the third gear position or when it is running at the speed higher than 50 km/hr., the slip ratio often becomes the value very close to 0.9, for example 0.85. In such cases, therefore, the pressure of the working oil is reduced.

Especially under the conditions (1'), (2') and (3'), the impacts tend to occur so that even when the above conditions may change within a very short time, the pressure of the working oil is reduced for a predetermined time interval.

The reduction in the pressure of the working oil may be accomplished under the above described conditions (1) to (4) by the following components in the control unit for controlling the working oil pressure:

Under the condition (1), by the 1st gear position discriminating circuit 1820, the slip ratio detecting circuit 1410; the AND gate 1910 and the OR gates 1980 and 1970. That is, when the slip ratio is in excess of 0.9 at the first gear, the signals from the 1st gear position discriminating circuit 1820 and the slip ratio detecting circuit 1410 are simultaneously applied to the AND circuit 1910 so that the output signal is derived therefrom. Therefore, both of the OR circuits 1980 and 1970 are energized so that the solenoid 810 is energized, thereby reducing the pressure of the working oil.

Under the condition (2), the circuit for setting the rotational speed 1340, the slip ratio detecting circuit 1420, the OR circuit 1930, the second gear position discriminating circuit 1830, the AND circuit 1920 and the OR circuits 1980 and 1970 are utilized. That is, when the slip ratio is in excess of 0.9 at the second gear ratio position or when the car-speed is less than 30 km/hr. ([N3] = 1,800 r.p.m.), the signal is derived in the wire 1422 or 1342 from either the slip ratio detecting circuit 1420 or the circuit 1340 for setting the rotational speed so that a signal is derived in the wire 1932 from the OR circuit 1930. And a signal is also derived in the wire 1832 from the second gear position circuit 1830 so that the AND circuit 1920 is applied with the signals from the wires 1932 and 1832, thereby generating the signal. Therefore, the solenoid 810 is energized through the OR circuits 1980 and 1970, whereby the pressure of the working oil is reduced.

Under the condition (3), the top or third gear position discriminating circuit 1840 and the OR circuits 1980 and 1970 are energized. That is, when the transmission is at the top gear position, the circuit 1840 generates the output signal which energizes the solenoid 810 through the OR circuits 1980 and 1970, whereby the pressure of the working oil is reduced.

Under the condition (4), the circuit 1390 for setting the rotational speed and the OR circuits 1980 and 1970 are energized. That is, when the car-speed becomes higher than 50 km/hr. ([N3] = 3,000 r.p.m.), the circuit 1390 generates the output signal so that the solenoid 810 is energized through the OR circuits 1980 and 1970, whereby the pressure of the working oil is reduced.

Under the condition (1'), the first gear position circuit 1820, the slip ratio detecting circuit 1410, the AND gate 1910, the synchronous time holding circuit 1960 and the OR circuit 1970 are energized. That is, when the slip ratio becomes higher than 0.9 even for an instantaneous time at the first or low gear, the output signals are derived from both of the first gear position circuit 1820 and the slip ratio circuit 1410 and applied to the AND circuit 1910 so that the output signal is derived therefrom. Therefore, the synchronous time holding circuit 1960 generates the output signals only for a predetermined very short time so that the solenoid 810 is energized through the OR circuit 1970, whereby the pressure of the working oil is reduced for predetermined short time.

Under the condition (2'), the circuit 1340, the slip ratio detecting circuit 1420, the OR circuit 1930, the second gear position circuit 1830, the AND circuit 1920, the synchronous time holding circuit 1940 and the OR circuit 1970 are utilized. That is, when the slip ratio becomes higher than 0.9 at the second gear or when the car-speed is lower than 30 km/hr. at the second gear, the circuit 1340, or the slip detecting circuit 1420 generates the output signals which energize the OR circuit 1930 thereby generating the output signal in the wire 1932. The output signal is also derived in the wire 1832 from the second gear position discriminating circuit 1830. The AND circuit 1920 generates the output signal because the signals are applied thereto from the wires 1932 and 1832 simultaneously. The synchronous time holding circuit 1940 generates the output signals for a predetermined short time after the time signal is derived from the AND circuit 1920. Therefore, the solenoid 810 is energized through the OR circuit 1970, whereby the pressure of the working oil is reduced for a predetermined short time.

Under the condition (3'), the circuit 1840, the synchronous time holding circuit 1950 and the OR circuit 1970 are energized. When the solenoid 1300 is energized so as to shift the transmission into the top or third gear position, the third gear position circuit 1840 generates the output signals so that the synchronous time holding circuit 1950 generates the output signals for a predetermined short time immediately after the output signals are derived from the circuit 1840. Therefore, the solenoid 810 is energized through the OR gate 1970, whereby the pressure of the working oil is reduced for said predetermined short time.

The present invention has been so far described as being applied to the three-forward-speed automatic transmission, but it will be understood that the present invention may be applied to the two-forward-speed automatic transmission and to the multi-forward-speed automatic transmission. In the instant embodiment, the pressure of the working oil has been described as being reduced when a slip ratio is in excess of a predetermined value at a predetermined gear position, but it will be understood that the pressure of the working oil may be reduced in response to a slip ratio. In this case, the signals from the slip circuits 1410 and 1420 are directly applied to the solenoid 810.

For example, as shown in FIG. 14 slip ratio circuit 1410 is directly connected to the pressure reducing solenoid 810 to cause energization of the latter when the slip ratio exceeds a predetermined value, e.g., 0.9.

What is claimed is:

1. An automatic transmission comprising a torque-converter;
   a gear transmission mechanism having an output shaft;
   frictional coupling means requiring working oil for drivingly connecting said mechanism to said torque-converter to establish any one of a plurality of gear meshing relations required of said gear transmission mechanism;
   a hydraulic actuating circuit including distribution valve means for selectively distributing said working oil to said frictional coupling means to cause selection of a required one of said gear meshing relations;
   an electrical control unit including
   slip ratio detecting circuit means for detecting slip ratio of said torque-converter,
   gear position discriminating circuit means for determining said required gear meshing relation of said gear transmission mechanism,
   rotational speed detecting circuit means for detecting the rotational speed of the said output shaft of said gear transmission mechanism,
   and gear shifting operational circuit means for controlling said distribution valve means in accordance with outputs from said slip ratio detecting circuit means, from said gear position discriminating circuit means and from said rotational speed detecting circuit means to control which of said gear meshing relations is selected as aforesaid,
   said hydraulic actuating circuit further including regulating valve means actuated in response to the slip ratio detecting circuit means output generated when the slip ratio of said torque-converter becomes higher than a predetermined value for reducing the pressure of the working oil distributed to said frictional coupling means through said distribution valve means.

2. An automatic transmission as in claim 1, wherein said electrical control unit further includes AND gate means connected to said slip ratio detecting circuit means and to said gear position discriminating circuit means for generating an output signal when the slip ratio of said torque-converter becomes higher than a predetermined value at a predetermined gear position, said regulating valve means being actuated in response to said output signal of said AND gate means.

3. An automatic transmission as in claim 1 wherein said electrical control unit further includes AND gate means and OR gate means, said AND gate means being connected to said slip ratio detecting circuit means and to said rotational speed detecting circuit means through said OR gate means and to said gear position discriminating circuit means for actuating said regulating valve means to reduce said working oil pressure by generating an output signal when the slip ratio of said torque-converter becomes higher than said predetermined value or the rotational speed of the output shaft of said gear transmission mechanism is less than a predetermined speed at a predetermined gear position.

* * * * *